(12) United States Patent
Feiler et al.

(10) Patent No.: US 8,328,164 B2
(45) Date of Patent: Dec. 11, 2012

(54) PRY BAR TOOL FOR APIARISTS

(76) Inventors: Fred John Feiler, Oneonta, NY (US); Susan Carolyn Garing, Kirkwood, NY (US)

( * ) Notice: Subject to any disclaimer, the term of this patent is extended or adjusted under 35 U.S.C. 154(b) by 301 days.

(21) Appl. No.: 12/905,180

(22) Filed: Oct. 15, 2010

(65) Prior Publication Data
US 2012/0091408 A1    Apr. 19, 2012

(51) Int. Cl.
*B66F 3/00* (2006.01)

(52) U.S. Cl. .......................................... 254/131; 254/25

(58) Field of Classification Search ................. 254/131, 254/21, 25, 28, 24, 131.5
See application file for complete search history.

(56) References Cited

U.S. PATENT DOCUMENTS

| | | | | |
|---|---|---|---|---|
| 3,987,827 A * | 10/1976 | Mills | | 81/45 |
| 5,054,180 A * | 10/1991 | Combs | | 29/275 |
| 5,092,562 A * | 3/1992 | Bomark | | 254/104 |
| 5,322,264 A * | 6/1994 | Giambro | | 254/25 |
| 5,820,107 A * | 10/1998 | Hall | | 254/25 |
| 6,488,266 B2* | 12/2002 | Macor | | 254/25 |
| 2003/0075710 A1* | 4/2003 | Sim | | 254/131 |
| 2011/0155979 A1* | 6/2011 | Sindt | | 254/131 |
| 2012/0091408 A1* | 4/2012 | Feiler et al. | | 254/131 |

* cited by examiner

*Primary Examiner* — Lee D Wilson

(57) ABSTRACT

A hive tool comprises an integrally formed elongated flat bar shaft with concavely shaped sides having a "Z" shaped portion at one end of the longitudinal axis and a gradually tapered straight edge on the other end. The "Z" shape end thereof is proportioned to slide between the frames of a hive box in the bee space and engages a top bar of a frame. The portion of the "Z" shape adjacent to the shaft provides a fulcrum holding one frame in place, while simultaneously lifting the other with an end flanged plane. A thrust and throw of the lever handle is required for operation.

4 Claims, 2 Drawing Sheets

PRY BAR TOOL FOR APIARISTS

FIELD OF INVENTION

This invention relates to the harvesting of honey from moveable frame bee hives and, more particularly, to prying apart and separating hive structural components including hive boxes and removable frames.

BACKGROUND OF INVENTION

In recent years the population of honey bee colonies has been declining due to mites and the many diseases that afflict honey bees. Presently, State agriculture departments are looking to increase the number of amateur hobbyist keepers. The United States Agriculture Department estimates that over the last two decades the number of commercial beehives fell to 2.4 million, down a quarter, and the loss of beekeepers by one-half. Manipulating honey bees effectively in a managed setting requires beekeepers to acquire a thorough understanding of honey bee biology and the treatment and prevention of diseases. Honey bee management also requires knowledge of apiary establishment, hive construction and beekeeping equipment.

Advancement in hive construction came in the 19th Century with the invention of a movable comb hive by Lorenzo Lorraine Langstroth, utilizing the discovery by Francois Huber that there is a specific natural spacing by honey bees between their wax combs, Langstroth designed a rectangular hive box containing a series of parallel wooden frames placed within the box leaving a space of 5 to 8 mm, or ¼ to ⅜" between the frames. This measurement is known as "the bee space". It is now a standard element incorporated in movable frame hive designs. When the hive design incorporates this bee space there is less wax and propolis buildup in the hive by the honey bees, thus allowing easier manipulation of hive components. The ability to remove and inspect frames (or naturally formed comb) from the hive box is a legal inspection requirement for all managed hives in the United States. The bee space also provides an access between components for the frame removal process. Wax and propolis deposited by honey bees will bind the frames strongly to the hive boxes and to adjacent frames. Removal of frames often requires a tool inserted into the bee space to separate and remove the frames for inspection of cells and for harvesting honey.

Hive tools with combined edges and shapes for removing the frames and prying apart movable hive sections are known to exist. Such prying and cutting tools are commonly shaped from flat ⅛" steel sheet and may include a hook to facilitate leverage for lifting the frame ear, and a blade for cutting the propolis and bees wax that may cement together any of the movable sections of a hive. Prying and scraping tools designed for non-beekeeping purposes are also used by beekeepers and are often preferred over currently available hive tools.

This application for United States patent discloses a unique hive tool supplying a specific functional need of the bee keeping industry. United States patents listed below disclose none of the hive tools or pry bar tools are specifically designed for all the particular dimensional elements of hive frames necessary to successfully accomplish the required tasks and expedite the beekeeper's work.

U.S. Pat. No. D248,086 for HIVE TOOL, issued Jun. 6, 1978 to William T. Maxant discloses the ornamental design of a hive tool, showing a combination cutting and prying tool shaped from a flat plane of material. A handle with two implements on opposing ends, one with honed edges on two adjacent sides of a 90 degree rectangular blade and the opposing end showing an arc shaped hook to be smaller than the width of the handle.

U.S. Pat. No. 2,593,304 for HIVE TOOL, issued Apr. 15, 1952 to William H. Howard discloses a hive tool comprising a flat shank portion having one end portion disposed at an angle to the plane of the shank and a coplanar lug portion flange, projecting laterally beyond the width of the shank portion at respective sides.

U.S. Pat. No. 865,062 for BEE-KNIFE, issued Sep. 3, 1907 to Isaac F. Sawyer discloses a tool consisting of a bar-form handle, having at one end a blade with a thin edge extending parallel to the handle, and a thin, wedge shaped edge extending perpendicular to the handle and having at its other end a hook.

U.S. Pat. No. 1,559,868 for TOOL FOR APIARISTS, issued Nov. 3, 1925 to Dean S. Hall discloses a tool for apiarists consisting of a utility tool with an elongated longitudinal shank having on one end an angled section disposed to one side of the longitudinal axis and on the other end a straight blade section. An apparatus for gripping frames by mechanical means, including movable parts, is connected to the shank handle.

U.S. Pat. No. 5,850,657 for WOODWORKING TOOL FOR PREPARING A WOOD SURFACE FOR FINISHING, issued Dec. 22, 1998 to Richard S. List, et al. discloses a wood working tool comprising an elongated handle with a straight spreader element on one end and a scraper element on the other end inclined longitudinal to the long axis of the handle less than 90 degrees.

Similar United States patents that disclose hand tools with sections for prying, pulling, or lifting and in combination with tools used for cutting or scraping include: U.S. Pat. No. 3,091,852 to Mathew De Larber, Jun. 4, 1963; U.S. Pat. No. 2,496,280 to Claude A. Endicott, Feb. 7, 1950; U.S. Pat. No. 1,434,744 to Eldred M. Hibbler, Nov. 7, 1922; U.S. Pat. No. 1,261,844 to Chambers S. Orr, Apr. 9, 1918; U.S. Pat. No. 6,488,266 to Richard J. Macor, Dec. 3, 2002; U.S. Pat. No. 6,629,684 to Robert H. Youngren, et al., Oct. 7, 2003; U.S. Pat. No. 5,957,429 to Zareh Khachatoorian, Sep. 28, 1999; U.S. Pat. No. 5,695,172 to Kenneth W. Hreha, Dec. 9, 1997; U.S. Pat. No. 5,322,264 to Peter Giambro, Jun. 21, 1994; U.S. Pat. No. 4,844,416 to Patrick Hand, Jul. 4, 1989; and U.S. Pat. No. 3,134,574 to Aldor S. E. Reuterfors, May 26, 1964.

A problem with the prior art exists whereby there is a degree of difficulty with the technique required for the operation of frame removal. There is a need for an improved combination hive tool to efficiently perform that operation in a user-friendly manner. None of these prior patents disclose or suggest the novel combination tool of the present invention.

SUMMARY OF THE INVENTION

In accordance with the present invention, there is provided an elongated flat shaft with sides forming a grip, being arc segments tangent to the mid-section of a lever handle. Disposed on one end of the longitudinal axis is a ground edged blade, not necessarily sharp, and on the other end a flanged "Z" shape prying platform. A ground edged blade being broader than the handle grip is known to exist in other combination tools, used in this case for general scraping and cutting wax and propolis, and for inserting into and prying apart movable joints having become fused with wax and propolis. A flanged "Z" shape of the invention contains a raised fulcrum for lifting frames, and a flanged edge to insert into the bee space, providing a method to grasp and lift the bottom edge of the top bar of a frame. The length of the planes of the "Z" shape and the adjoining angles of the planes are calculated to work with a variance in the bee space and the predetermined dimensions of hive frames. A vertical downward thrust into the bee space to contact the fulcrum on the top of a frame, and a throw of the lever will engage the bottom edge of the top bar of an adjacent frame with the flange, extracting it in a generally vertical upward path. Such action will break the seal of propolis and wax deposited by the honey bees to seal the components together. The arrangement of the offset planes disposed to one side of the longitudinal axis of the shaft will lift a frame in a generally vertical direction allowing enough clearance for the beekeeper to grip the top bar section of the frame with his or her hands, thereby completely removing it from the hive box.

A BRIEF DISCRIPTION OF THE DRAWINGS

A complete understanding of the present invention may be attained by refrence to the accompanying drawings and a detailed description for further consideration will show:

FIG. 4b is a proportionally scaled profile showing detail cross-section of a side elevation of the "Z" end of the invention in a work application with respect to FIG. 3a.

For the purpose of clarity and brevity, like elements will bear the same designations and symbols throughout the FIGURES.

DESCRIPTION OF PREFERRED EMBODIMENT

Figure 1:
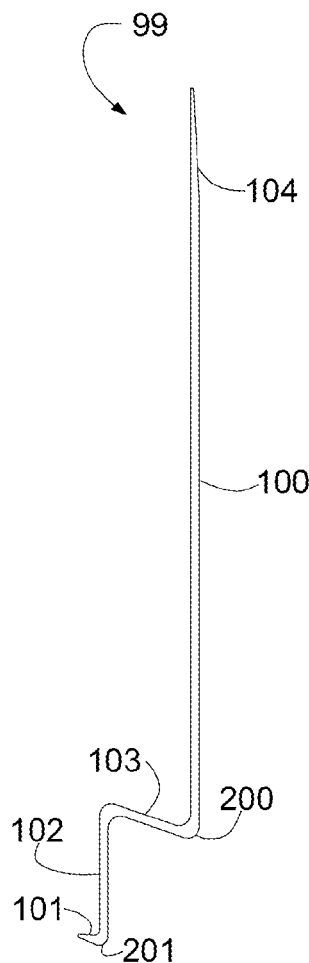
FIG. 1 is a proportionally scaled profile view of a side elevation of the invention including detailed proximate and distal ends, respectively, and angled plane sections thereof.

Two useful tools are disposed on opposite ends of a lever handle. On one end of the lever handle is a broad flat tapered end (104) for the multipurpose uses of scraping, cutting, prying and lifting, and on the other end is a "Z" shaped arrangement of planes and angles of a platform used for the removal of hive frames. The lever action and lifting capabilities of the hive tool on the "Z" end is dependent on a flanged edge being offset from the lever handle and a fulcrum (200) predisposed by a plane adjoining the handle plane with adjacent sides forming an acute angle. The flanged edge is inserted into the bee space and will stop at the fulcrum, resting on the top of an adjacent frame (301) to one designated for removal (302). Force is applied to the lever handle engaging the flange on the bottom edge of the designated frame top bar (302) and lifting the entire frame upward.

Figure 2:
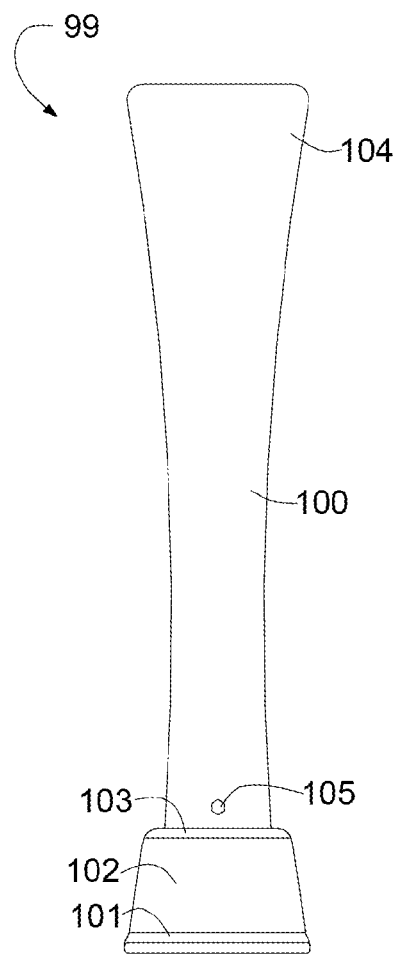
FIG. 2 is detailed front elevation proportionally scaled perspective view of plane dimensions, respectively, to FIG. 1.

Referring first to FIG. 2, there is shown a perspective front elevation with view of the combination tool of the invention, including end regions thereof, generally at reference number 99.

Hive tool 99 has an elongated flat shaft disposed longitudinally with sides being arc segments tangent to the midsection 100 of a lever handle forming a grip having a center of gravity slightly closer to the "Z" end, comprised of three planes 101,102 and 103 respectively, lending to an intuitive vertical position for use in the user's hand. Corners and edges of hive tool 99 are slightly rounded to allow the user to grasp the "Z" end in palm of hand when using the opposite end 104, being in a continuous plane with handle leaver 100 and having a taper to a not necessarily sharp edge. In the embodiment chosen for purposes of disclosure, the length of hive tool 99 is approximately 230 millimeters on the longitudinal axis, approximately 43 millimeters in width at the flanged edge 101 of the "Z" end, and approximately 40 millimeters in width at the other end 104. It will be recognized that other predetermined measurements could be chosen to meet particular apiary and beekeepers' requirements. Consequently, the invention comprehends any dimension of width ranging from 10 to 100 millimeters and length ranging from 100 millimeters to 1 meter. The hive tool 99 including a "Z" shaped platform end may be made from any carbon steel alloy, cold forged and heat treated, or any other metal and process known to those of skill in the art of metallurgy. The hive tool fabrication may include any coating, plating and finishes known to those skilled in the art for aesthetic and practical purposes. The disclosed embodiment also shows in FIG. 2, centered on the shaft 100 in close proximity to the "Z" end, a ⅜ inch hole 105 useful for the pulling of headed nails. The hole 105 may be round or any other shape, including a nail slot parallel to the long axis.

Referring now to FIG. 1, there is shown a scaled proportional profile view of a side elevation of hive tool 99 including detailed proximate and distal ends respectively to FIG. 2 and angled plane sections 101, 102, and 103 of the "Z" shaped platform end. In the preferred embodiment shown in FIG. 1, lever shaft 100 shows an adjacent plane 103 measuring approximately 27 millimeters in length, disposed to one side of the long axis at an angle of 71 degrees. On the other end of plane 103 is an adjacent plane 102 measuring approximately 35 millimeters disposed to one side of plane 103 at an angle of 71 degrees and generally parallel to the long axis. Finally, on the other end of plane 102 is an adjacent plane 101 measuring approximately 8 millimeters disposed to one side of plane 102 at an angle of 85 degrees. Plane 101, previously referred to as a flanged edge, may be ground to close tolerance removing inside radius and shaping outside radius 201 to perform plunging action when inserted into "the bee space" between hive components. A stop and fulcrum 200 is disposed to an angle of 289 degrees by plane 100 and adjacent plane 103. It will be recognized that other predetermined measurements of planes and angles could be chosen to meet particular changes in hive frame dimensions. Consequently, the invention comprehends any measurement of planes 102 and 103 in a range of 10 millimeters to 100 millimeters, and plane 101 in a range of 5 millimeters to 50 millimeters. Likewise, the invention comprehends any measurements of angles formed by adjacent planes 100, 103, 102, and 101 respectively, to be in a range of 20 degrees to 160 degrees to the long axis of the preferred embodiment described herein.

Figure 3:
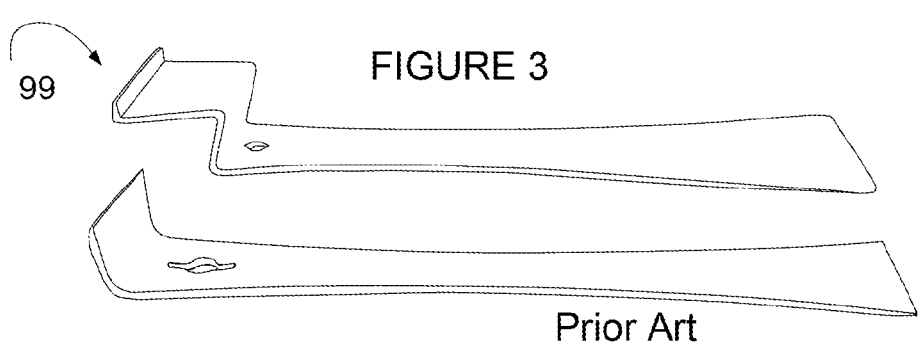
FIG. 3 is a perspective view of the hive tool of the invention and of prior art.

Referring to FIG. 3, there is a perspective view showing the relationship of planes and angles of the hive tool of the invention 99. There is also shown in like perspective a comparative view of Prior Art known to exist. The aforementioned planes and adjoining angles of hive tool 99 provide greater leverage for lifting hive frames and ergonomic positioning for plunging into the bee space.

Figure 4B:
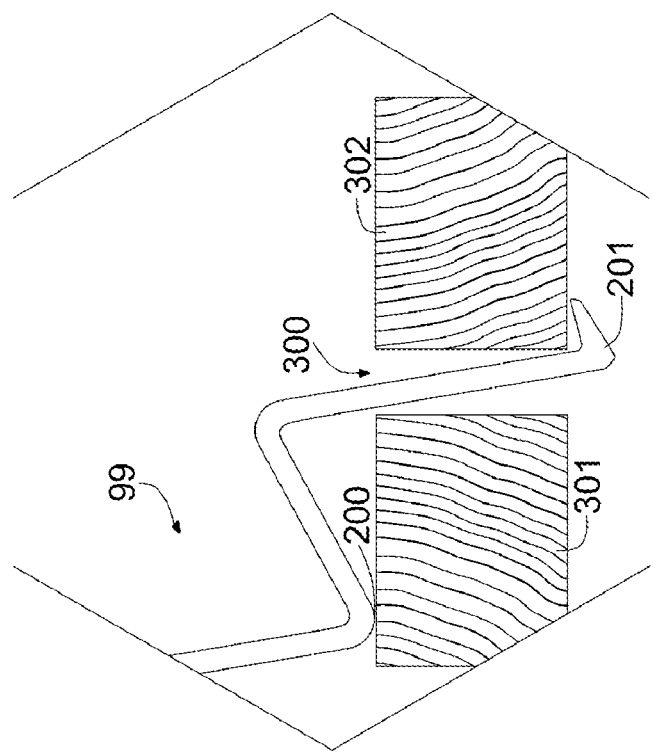
Figure 4A:
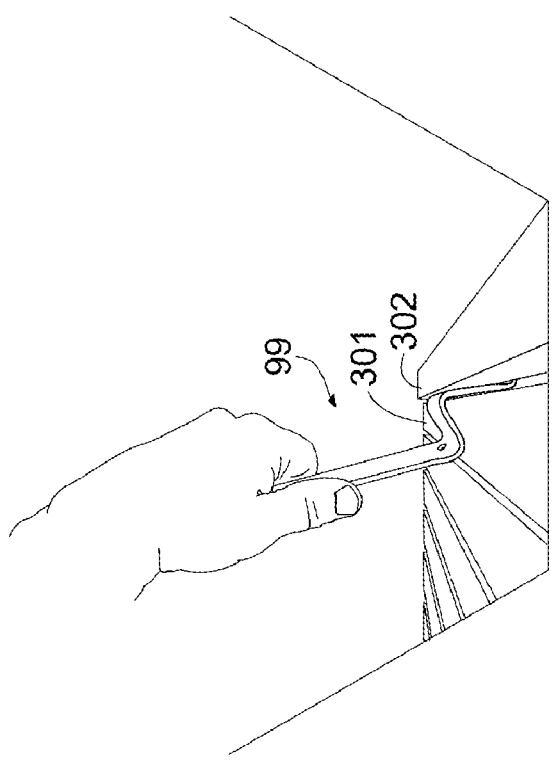
FIG. 4a is a perspective view showing the "Z" end of the invention engaged in a work application.

Referring to FIGS. 4a and 4b; 4a is a perspective view showing the hive tool of the invention 99 in use, and 4b is a proportionally scaled profile showing detail of a side elevation respectively to 4a, including a crosscut view of the top bars of a hive frame and "Z" platform end. Hive tool 99 may be used with one hand either left or right in any approach respective to the user's position to the hive box for the purpose of loosening frames for removal. Flanged end 201 is inserted into "the bee space" 300 between the top bars of two frames to the point of contacting fulcrum 200 with frame 301. The fulcrum thus provides a controlled stop to the plunging action causing limited damage to honeycomb cells and correctly positioning the flange 201. Force is applied to one side of hive tool 99 engaging flange 201 beneath frame 302 and lifting the frame. Consequently, a thrust and throw of the lever handle is required for operation of the invention hive tool 99.

It will be recognized that the embodiment described hereinabove may require modification and changes varied to fit particular structures to which the invention is applied, obvious to those skilled in the art. Consequently, the invention is not considered limited to the examples chosen for the purposes of disclosure, and covers all changes and modifications which do not constitute departures from the true spirit and scope of this invention.

Having thus described the invention, what is desired to be protected by Letters Patent is presented in the subsequent appended claims:

1. A pry bar comprising an elongated shaft defining a major axis having a functional part disposed at the proximal end and a functional part disposed at the distal end of said elongated shaft;
    a) a lever handle centrally defined on said elongated shaft;
    b) a "Z" shaped platform disposed at, at least one end of said elongated shaft; and
    c) a tapered edge disposed at, at least one end said elongated shaft, wherein said Z shaped platform extends from said at least one end of said elongated shaft with said Z shaped platform first end being at an acute angle, an intermediate section of said Z shaped platform extending in opposite direction forming an inverse acute angle and an end portion of said Z shaped platform extending perpendicularly to said intermediate portion of said Z shaped platform and perpendicularly to said elongated shaft.

2. The pry bar as recited in claim 1, wherein said end portion appears as a flange which has a straight inner surface and a tapered wedge shaped outer surface.

3. The pry bar as recited in claim 1, wherein said elongated shaft has a nail pulling slot proximate said second end before said acute angled portion of said Z shaped platform.

4. The pry bar as recited in claim 1, wherein said elongated shaft has a nail pulling aperture proximate said second end before said acute angled portion of said Z shaped platform.

* * * * *